United States Patent
Yang et al.

(10) Patent No.: US 10,764,626 B2
(45) Date of Patent: Sep. 1, 2020

(54) METHOD AND APPARATUS FOR PRESENTING AND CONTROLLING PANORAMIC IMAGE, AND STORAGE MEDIUM

(71) Applicant: TENCENT TECHNOLOGY (SHENZHEN) COMPANY LIMITED, Shenzhen, Guangdong (CN)

(72) Inventors: Dan Yang, Shenzhen (CN); Xian Jun Wang, Shenzhen (CN); You Zhou, Shenzhen (CN); Yi Xie, Shenzhen (CN); Gang Xu, Shenzhen (CN); Jia Qu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/390,171

(22) Filed: Apr. 22, 2019

(65) Prior Publication Data
US 2019/0246162 A1 Aug. 8, 2019

Related U.S. Application Data

(63) Continuation of application No. PCT/CN2018/080819, filed on Mar. 28, 2018.

(30) Foreign Application Priority Data

Mar. 28, 2017 (CN) .......................... 2017 1 0191254

(51) Int. Cl.
*H04N 21/422* (2011.01)
*H04N 21/6587* (2011.01)
(Continued)

(52) U.S. Cl.
CPC ..... *H04N 21/4222* (2013.01); *H04N 21/4126* (2013.01); *H04N 21/42208* (2013.01);
(Continued)

(58) Field of Classification Search
CPC ........... H04N 21/4222; H04N 21/4126; H04N 21/436; H04N 21/472; H04N 21/43637;
(Continued)

(56) References Cited

U.S. PATENT DOCUMENTS

2014/0270693 A1  9/2014  Suzuki
2014/0327666 A1  11/2014  Suzuki et al.
(Continued)

FOREIGN PATENT DOCUMENTS

CN  103051964 A  4/2013
CN  105898460 A  8/2016
(Continued)

OTHER PUBLICATIONS

International Search Report for PCT/CN2018/080819 dated Jun. 20, 2018 [PCT/ISA/210].
(Continued)

*Primary Examiner* — Kunal Langhnoja
(74) *Attorney, Agent, or Firm* — Sughrue Mion, PLLC

(57) ABSTRACT

A method for presenting and controlling a panoramic image is provided. The method includes: sending a panoramic image trigger instruction to a media content server in response to a panoramic image trigger operation, wherein the panoramic image trigger instruction causes the media content server to send the panoramic image trigger instruction to a smart television bound with the mobile terminal, and the panoramic image trigger instruction causes the smart television to present the panoramic image corresponding to currently presented media content; obtaining a description parameter indicating a position of the mobile terminal in
(Continued)

three-dimensional space; and sending the description parameter to the media content server, wherein the media content server determines an adjustment parameter of the panoramic image in panoramic space according to the description parameter and sends the adjustment parameter to the smart television, and the smart television adjusts the panoramic image according to the adjustment parameter.

17 Claims, 11 Drawing Sheets

(51) Int. Cl.
- *H04N 21/81* (2011.01)
- *H04N 21/478* (2011.01)
- *H04N 21/431* (2011.01)
- *H04N 21/4363* (2011.01)
- *H04N 21/472* (2011.01)
- *H04N 21/436* (2011.01)
- *H04N 21/41* (2011.01)

(52) U.S. Cl.
CPC ..... *H04N 21/42222* (2013.01); *H04N 21/436* (2013.01); *H04N 21/4312* (2013.01); *H04N 21/43637* (2013.01); *H04N 21/472* (2013.01); *H04N 21/478* (2013.01); *H04N 21/4781* (2013.01); *H04N 21/6587* (2013.01); *H04N 21/812* (2013.01); *H04N 21/816* (2013.01)

(58) Field of Classification Search
CPC .......... H04N 21/4781; H04N 21/4312; H04N 21/816; H04N 21/478; H04N 21/812; H04N 21/42222; H04N 21/6587; H04N 21/42208
See application file for complete search history.

(56) References Cited

U.S. PATENT DOCUMENTS

| | | | |
|---|---|---|---|
| 2016/0094866 A1* | 3/2016 | Frazzini | H04N 21/4781 725/10 |
| 2016/0259420 A1 | 9/2016 | Kim et al. | |
| 2017/0171592 A1* | 6/2017 | Cui | G06F 3/04845 |
| 2018/0115807 A1* | 4/2018 | Todorovic | H04N 21/6587 |
| 2019/0320111 A1* | 10/2019 | Zhao | G06K 9/32 |

FOREIGN PATENT DOCUMENTS

| | | |
|---|---|---|
| CN | 105913478 A | 8/2016 |
| CN | 106028132 A | 10/2016 |
| CN | 106296819 A | 1/2017 |
| CN | 107659851 A | 2/2018 |
| JP | 2013-59573 A | 4/2013 |
| JP | 2013-150202 A | 8/2013 |
| JP | 2013-251787 A | 12/2013 |
| JP | 2014-132431 A | 7/2014 |

OTHER PUBLICATIONS

Communication dated May 7, 2019, from the State Intellectual Property Office of People's Republic of China in counterpart Application No. 201710191254.X.

Communication dated Jun. 17, 2019, from the State Intellectual Property Office of the P.R.C in counterpart application No. 201710191254.X.

Written Opinion in International Application No. PCT/CN2018/080819, dated Jun. 20, 2018.

Office Action dated Apr. 27, 2020 in Japanese Application No. 2019-520848.

Isawa et al., "A New Method for Detecting the Position of Mobile Computer Using Wireless LAN (II)", IPSJ SIG Technical Report, vol. 2004, No. 79, pp. 25-30, Jul. 30, 2004 (6 pages total).

* cited by examiner

METHOD AND APPARATUS FOR PRESENTING AND CONTROLLING PANORAMIC IMAGE, AND STORAGE MEDIUM

CROSS REFERENCE TO RELATED APPLICATIONS

This application is a continuation of International Patent Application No. PCT/CN2018/080819, which claims priority from Chinese Patent Application No. 201710191254.X, filed with the Chinese Patent Office on Mar. 28, 2017, the disclosures of which are incorporated by reference in their entireties.

BACKGROUND

Field

Methods and apparatus relate to computer technologies, and in particular, to a method and an apparatus for presenting and controlling a panoramic image, and a storage medium.

Related Art

An image having a horizontal viewing angle of 360 degrees and a vertical viewing angle of 180 degrees may be referred to as a panoramic image. A panoramic image may have a stereoscopic effect and may be a cost-efficient virtual reality solution. In a panoramic technology, a mutual relationship between a character and an entire action of the character can be fully presented. In a panorama, usually, a character and the environment can be integrated to create a vivid picture including both the character and scenes.

An increasing number of digital television terminals have a powerful computing capability and a digital processing capability continues to increase. Also, smart televisions, such as network televisions that can be directly connected to the Internet, have appeared. Images in videos played on current smart televisions have limited viewing angle ranges and lack a stereoscopic effect.

SUMMARY

One or more embodiments provide a method for presenting and controlling a panoramic image.

According to an aspect of an embodiment, there is provided a method for presenting and controlling a panoramic image that is performed by at least one processor of a mobile terminal. The method includes: sending, by the at least one processor, a panoramic image trigger instruction to a media content server in response to a panoramic image trigger operation, wherein the panoramic image trigger instruction causes the media content server to send the panoramic image trigger instruction to a smart television bound with the mobile terminal, and the panoramic image trigger instruction causes the smart television to present the panoramic image corresponding to currently presented media content; obtaining, by the at least one processor, a description parameter indicating a position of the mobile terminal in three-dimensional space in response to an operation of the mobile terminal; and sending, by the at least one processor, the description parameter to the media content server, wherein the media content server determines an adjustment parameter of the panoramic image in panoramic space according to the description parameter and sends the adjustment parameter to the smart television, and the smart television adjusts the panoramic image according to the adjustment parameter. According to other aspects of various embodiments, there is also provided apparatuses, devices, systems and non-transitory computer readable mediums consistent with the method above.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
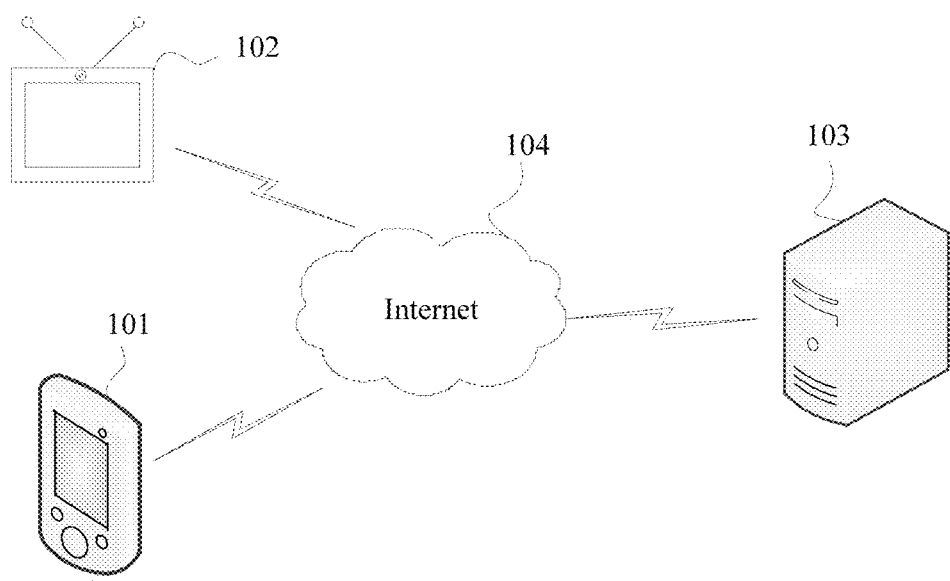
FIG. 1 is an architectural diagram of a system according to an embodiment.

One or more embodiments provide a method and an apparatus for adjusting a viewing angle of a panoramic image. A system architecture to which the method is applied is shown in FIG. 1. The system architecture includes a mobile terminal 101, a smart television 102, a media content server 103, and the Internet 104. The mobile terminal 101 and the smart television 102 are connected to the media content server 103 through a network such as the Internet 104.

The mobile terminal 101 may be a smartphone, a personal digital assistant (PDA) of a user or another portable device of a user, on which client software of various application software is installed. A user may log in to and use various application software by using the mobile terminal 101, and the client of the application software may be a video play client. The Internet 104 may include a wired network and a wireless network. The smart television 102 is installed with a video play application client, to play an online video resource or a local video resource.

Figure 2:
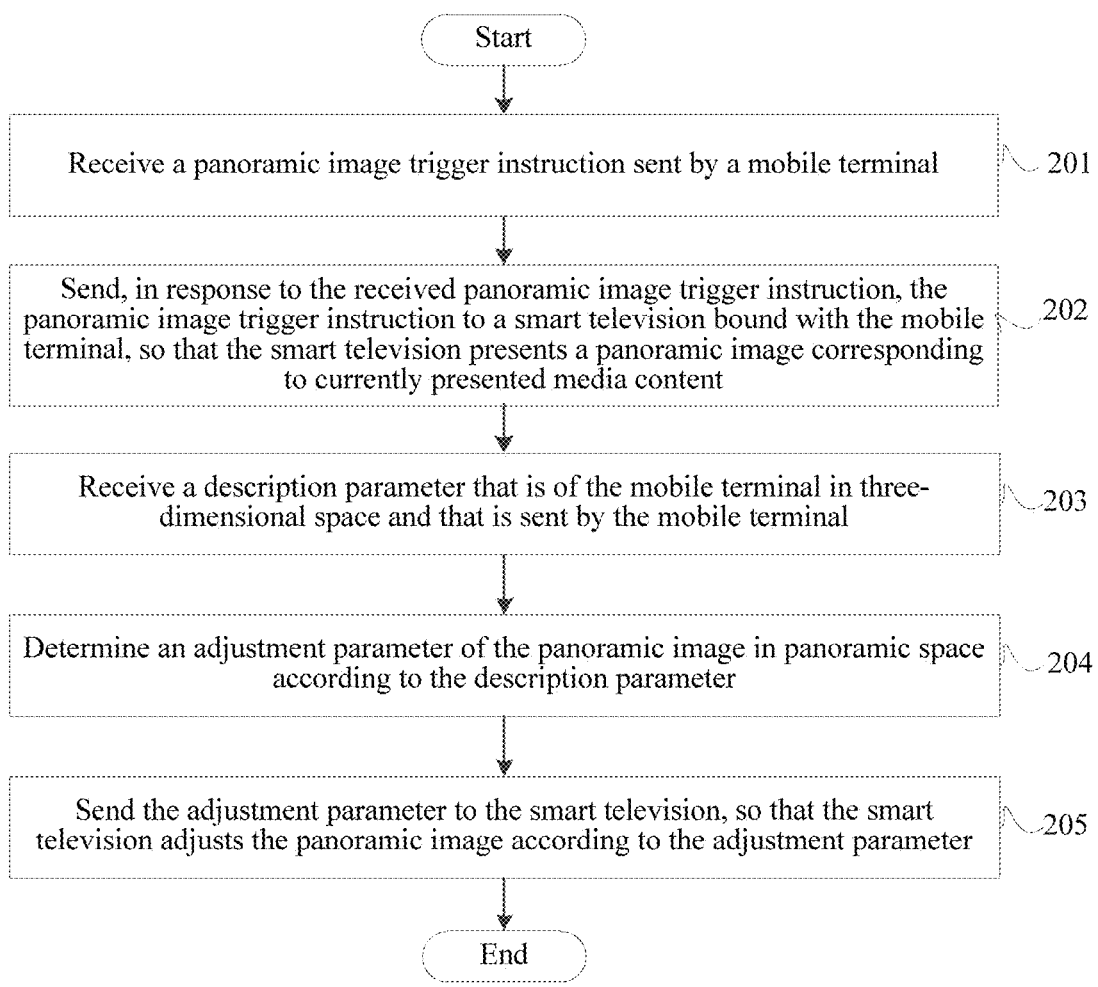
FIG. 2 is a flowchart of a method for presenting and controlling a panoramic image applied to a server side according to an embodiment.

This application provides a method for presenting and controlling a panoramic image, applied to the media content server 103. As shown in FIG. 2, the method mainly includes the following steps:

Step 201: Receive a panoramic image trigger instruction sent by a mobile terminal.

Herein, a panoramic image may be a panoramic picture or a panoramic video. First, the mobile terminal 101 establishes a binding with the smart television 102. The panoramic image trigger instruction may be a binding acknowledgment instruction sent by the mobile terminal 101 to the media content server 103 after the mobile terminal 101 is successfully bound with the smart television 102. For example, the mobile terminal is bound with the smart television by scanning a pattern identification code presented on the smart television. When the mobile terminal scans and identifies the pattern identification code, the mobile terminal sends the panoramic image trigger instruction to the media content server. After receiving the panoramic image trigger instruction, the media content server 103 sends a panoramic image presentation instruction to the smart television 102, so that the smart television presents a panoramic image. In some embodiments, after the mobile terminal 101 is bound with the smart television 102, a web page of a panoramic image is automatically opened on the mobile terminal, and the panoramic image is synchronously presented on the web page of the panoramic image and on the smart television.

Figure 3:
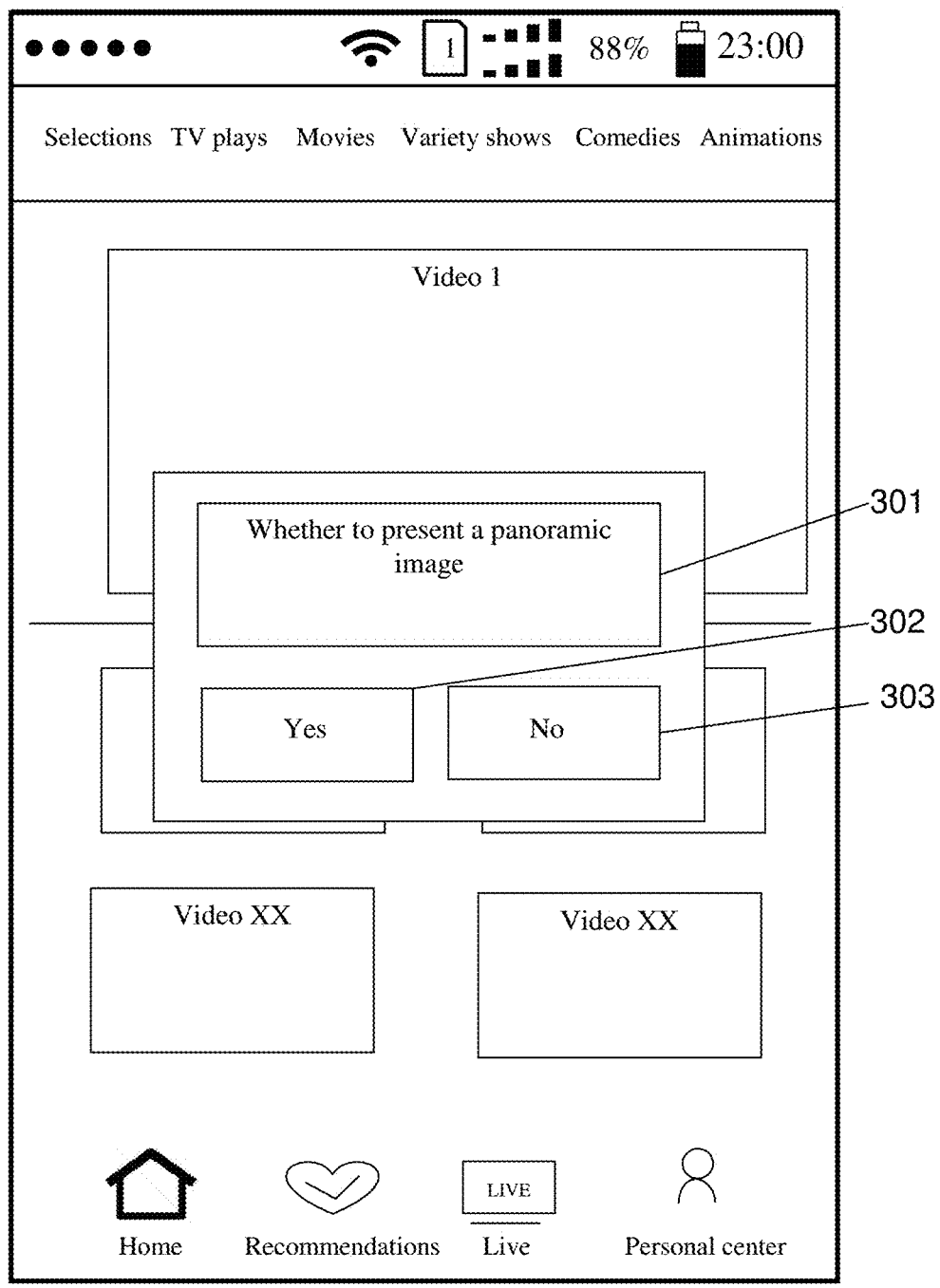
FIG. 3 is a diagram of a page presenting a panoramic image trigger option on a mobile terminal according to an embodiment.

In some embodiments, the panoramic image trigger instruction may alternatively be implemented in another manner. For example, the smart television 102 sends a panoramic image play request to the media content server 103, and the media content server sends the play request to the mobile terminal, to determine, according to a selection of a user, whether to present a panoramic image. Presentation of a panoramic image of an advertisement is used as an example. When the smart television 102 is to present an advertisement, the smart television 102 sends a panoramic image presentation request to the media content server 103, and the media content server 103 sends, to the mobile terminal 101, prompt information 301 indicating whether to present a panoramic image. As shown in FIG. 3, the mobile terminal 101 presents the prompt information 301 on a video application installed on the mobile terminal 101 and also presents a Yes option 302 and a No option 303. When the user selects the option 302, the mobile terminal 101 sends a presentation acknowledgment message to the media content server 103, and the media content server 103 sends the presentation acknowledgment message to the smart television 102, so that the smart television presents the panoramic image of the advertisement. The panoramic image may be a panoramic picture or a panoramic video. When the user selects the option 303, the mobile terminal 101 does not send a presentation acknowledgment message to the media content server 103, and correspondingly, the smart television 102 does not present the panoramic image.

Step 202. Send, in response to the received panoramic image trigger instruction, the panoramic image trigger instruction to a smart television bound with the mobile terminal, so that the smart television presents a panoramic image corresponding to currently presented media content.

After receiving the panoramic image trigger instruction, the smart television presents the panoramic image corresponding to the currently presented media content. Panoramic image data may be previously sent by the media content server 103 to the smart television 102. For example, when the smart television requests the media content server 103 for a video, the video carries an advertisement. When sending the video data to the smart television, the media content server sends a material corresponding to the advertisement to the smart television. The material corresponding to the advertisement may include a panoramic image or a panoramic video corresponding to the advertisement.

Step 203. Receive a description parameter that is of the mobile terminal in three-dimensional space and that is sent by the mobile terminal. The description parameter may include a location change parameter and a posture change parameter.

The location change parameter of the mobile terminal 101 may be obtained through indoor positioning, and specifically, through Wi-Fi indoor positioning or Bluetooth indoor positioning. Specifically, for the Wi-Fi indoor positioning, the mobile terminal may be positioned by using a wireless signal strength of a wireless network access point that is received by the mobile terminal. Coordinates of a Wi-Fi hotspot are known, the mobile terminal receives a signal from the Wi-Fi hotspot, and a strength of the signal has a specific relationship with a distance between the Wi-Fi hotspot and the mobile terminal. Therefore, the distance between the mobile terminal and the Wi-Fi hotspot may be obtained by using the strength of the signal. According to distances between the mobile terminal and more than three Wi-Fi hotspots, coordinates of the mobile terminal may be obtained by using coordinates of the Wi-Fi hotspots. Another manner of the Wi-Fi indoor positioning is similar to fingerprint identification, a plurality of semantic locations is defined, and a Wi-Fi signal is collected for each semantic location to form a "fingerprint database". During positioning, a Wi-Fi signal measured by the mobile terminal is compared with a Wi-Fi signal already existing in the "fingerprint database", to determine a Wi-Fi signal at a location in the "fingerprint database" that best matches this new signal. In this case, it may be considered that the mobile terminal is most possibly at the location.

In the Bluetooth indoor positioning, several Bluetooth local area network access points are disposed indoors, to enable a network to be in a basic network connection mode based on a plurality of users, and ensure that the Bluetooth local area network access points are always primary devices in this micronet. Then, triangle positioning is performed on the mobile terminal by measuring a signal strength of a Bluetooth signal received by the mobile terminal.

The user may randomly move the mobile terminal upward, downward, leftward, rightward, upward to the left, downward to the right, or the like, may rotate, push, pull the mobile terminal, or may push, pull, and/or rotate the mobile terminal while moving the mobile terminal upward, downward, leftward, rightward, upward to the left, downward to the left, upward to the right, downward to the right, or the like. The location change parameter of the mobile terminal 101 may be determined according to previous location coordinates and current location coordinates of the mobile terminal. The previous location coordinates and the current location coordinates of the mobile terminal may be obtained through the Wi-Fi indoor positioning or the Bluetooth indoor positioning. The location change parameter of the mobile terminal in the three-dimensional space is determined according to coordinates of a reference point location and coordinates of a current location of the mobile terminal 101.

When the posture change parameter is obtained for the mobile terminal, the mobile terminal 101 is provided with a gyroscope, and the gyroscope may provide a gravity direction, that is, a vertical direction. A deflection angle at a reference point and a deflection angle at a current location that are of the mobile terminal are determined according to a sensor parameter obtained from the gyroscope, and the posture change parameter of the mobile terminal 101 is determined according to the deflection angle at the reference point and the deflection angle at the current location that are of the mobile terminal 101.

After determining the location change parameter and/or the posture change parameter, the mobile terminal may present the location change parameter and/or the posture change parameter. The mobile terminal presents data of a deflection angle change, a location change, and the like according to an operation such as rotation or movement. For example, if the mobile terminal is rotated counter-clockwise by 30 degrees, the value −30 degrees is correspondingly displayed on the mobile terminal; if the mobile terminal is moved leftward by a distance of X, −X is correspondingly displayed on the mobile terminal; if the mobile terminal is directly moved upward to the left, which is decomposed into moving leftward by a distance of X and upward by Y, the data (−X, Y) is correspondingly displayed; if the mobile terminal is directly moved leftward by a distance of X and upward by a distance of Y, and moved in a direction close to the smart television by a distance of Z, the data (−X, Y, Z) is correspondingly displayed. Movement in another direction in the three-dimensional space is similar.

Step 204. Determine an adjustment parameter of the panoramic image in panoramic space according to the description parameter. The adjustment parameter may include a viewpoint adjustment parameter and a viewing-angle adjustment parameter, the viewpoint adjustment parameter may be determined according to the location change parameter in the description parameter, and the viewing-angle adjustment parameter may be determined according to according to the posture change parameter in the description parameter.

When the panoramic image data is obtained, panoramic images with 360 degrees or panoramic images with 720 degrees are taken at different photographing locations, different photographing locations corresponding to different viewpoints, and coordinates of the viewpoints are recorded. At a fixed viewpoint, panoramic images with 360 degrees or panoramic images with 720 degrees are taken, different angles corresponding to different viewing angles. In this way, a panorama coordinate database including three-dimensional coordinates of a viewpoint and a viewing angle is formed, different viewpoints and viewing angles corresponding to different panoramic images. A first reference point of the mobile terminal in the three-dimensional space corresponds to a second reference point in the panoramic space, and coordinates and a posture of the mobile terminal in the three-dimensional space correspond to viewpoint coordinates and a viewing angle in the panorama coordinate database. A viewpoint change parameter and a viewing angle change parameter of a viewpoint and a viewing angle of the panoramic image corresponding to the current location of the mobile terminal with respect to the second reference point in the panoramic space can be determined according to a location change parameter and/or a posture change parameter of the mobile terminal in the three-dimensional space with respect to the first reference point of the mobile terminal.

Step 205. Send the adjustment parameter to the smart television, so that the smart television adjusts the panoramic image according to the adjustment parameter.

After obtaining the viewpoint change parameter and the viewing angle change parameter of the viewpoint and the viewing angle of the panoramic image corresponding to the current location of the mobile terminal with respect to the second reference point in the panoramic space, the media content server sends the viewing-angle adjustment parameter and/or the viewpoint adjustment parameter to the smart television, so that the smart television determines, according to the viewing-angle adjustment parameter and/or the viewpoint adjustment parameter, the viewpoint and the viewing angle of the panoramic image corresponding to the current location of the mobile terminal, and then presents the viewpoint and the viewing angle of the panoramic image.

Figure 4:
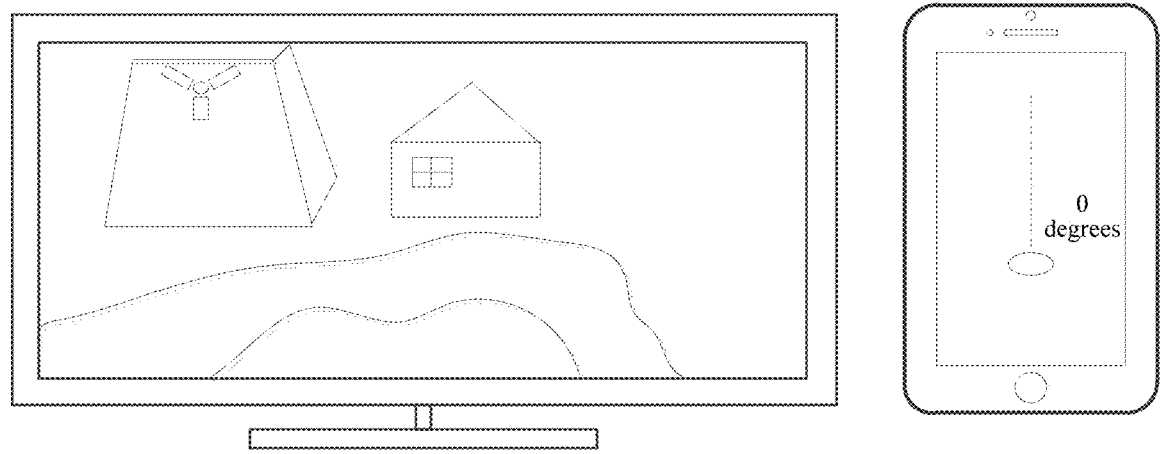
FIG. 4 is a schematic diagram of presenting a panoramic image on a smart television according to an embodiment.
Figure 5:
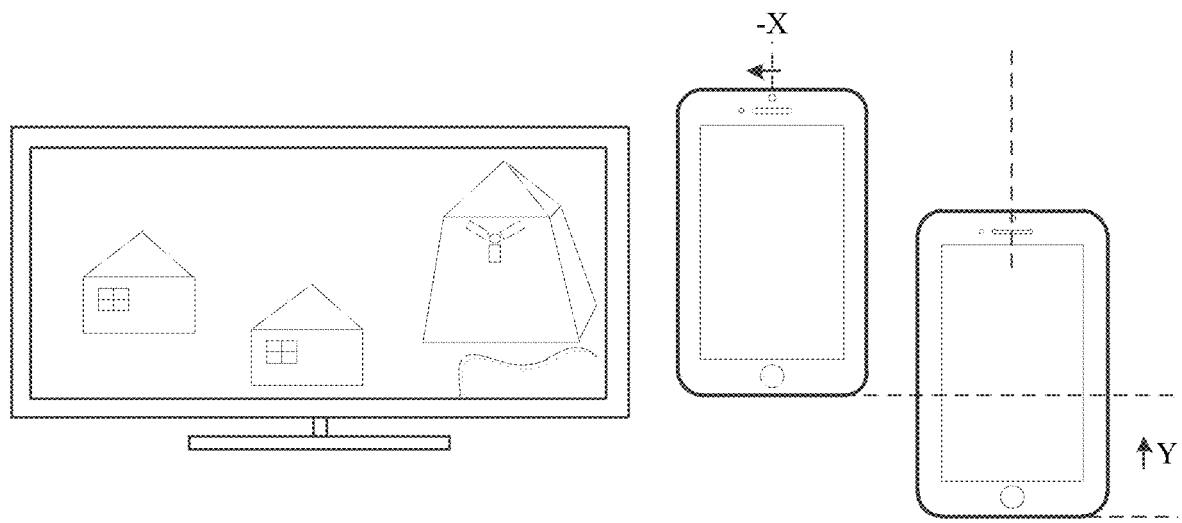
FIG. 5 is a schematic diagram of an image obtained after a panoramic image is translated according to an embodiment.
Figure 6:
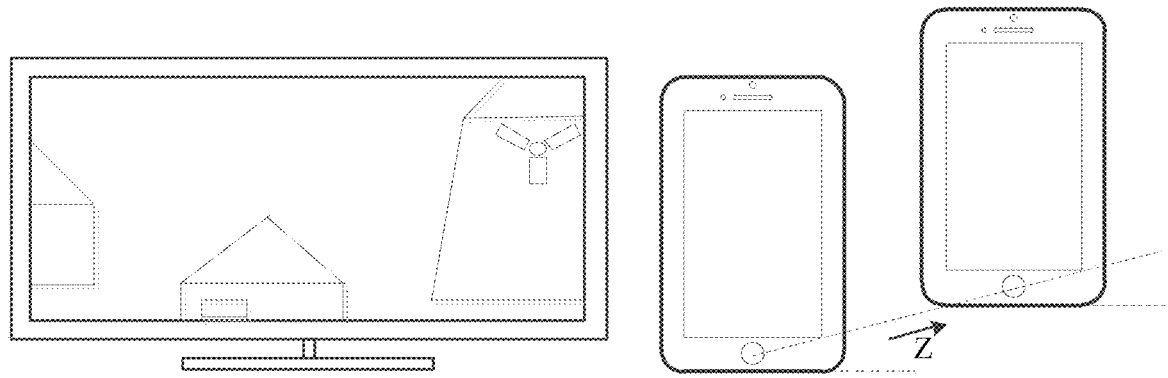
FIG. 6 is a schematic diagram of an image obtained after a panoramic image is enlarged according to an embodiment.

As shown in FIG. 4, the smart television presents an advertisement of a resort, and the smart television presents a panoramic image of the advertisement. As shown in FIG. 5, after the mobile terminal is moved leftward by X and upward by Y, the media content server determines, through data matching, that a viewpoint of the panoramic image is moved leftward by X1 and upward by Y1, and sends the viewpoint adjustment parameter to the smart television. The smart television presents, according to the viewpoint adjustment parameter, a panoramic image whose viewpoint is moved leftward by X1 and upward by Y1. As shown in FIG. 6, after the mobile terminal is moved backward by Z, the media content server determines, through data matching, that a viewpoint of the panoramic image is moved backward by Z1, and sends the viewpoint adjustment parameter to the smart television. The smart television presents, according to the viewpoint adjustment parameter, a panoramic image whose viewpoint is moved backward by Z1. Forward and backward movement of the viewpoint of the panoramic image provides the user with a visual effect of image enlarging and reducing. After the viewpoint is moved backward by Z1, the panoramic image is enlarged by a corresponding multiple for presentation. After the viewpoint is moved forward by Z1, the panoramic image is reduced by a corresponding multiple for presentation.

According to the method for presenting and controlling a panoramic image provided in this application, a viewpoint and a viewing angle of a panoramic image on the smart television are adjusted according to a location change and a posture change of the mobile terminal in the three-dimensional space. In this way, the panoramic image is more flexibly adjusted in more dimensions. A user can view the panoramic image naturally, just like the user carries a camera to move in any direction to take a video.

The method for presenting and controlling a panoramic image provided in this application may be applied to, for example, presentation and controlling of a panoramic image of an advertisement. For example, an automotive interior advertisement is presented by using a panoramic video. The panoramic video is presented on a smart television, and a user may connect a mobile phone to the smart television, to view details of automotive interiors at different angles by controlling the mobile phone to rotate and move (where the mobile phone is used as a camera to adjust to different locations). The method for presenting and controlling a panoramic image provided in this application is applied to not only advertisements but also the gaming field, for example, to a shooting game. This helps position a character and look for a bonus, treasure, equipment, and the like in space. The mobile terminal may further replace a game pad, and a game character can be controlled to move or the like by using a mobile phone.

In some embodiments, the description parameter includes the location change parameter and the posture change parameter, and the adjustment parameter includes the viewing-angle adjustment parameter and the viewpoint adjustment parameter.

The determining an adjustment parameter of the panoramic image in panoramic space according to the description parameter includes:

determining the viewpoint adjustment parameter of the panoramic image in the panoramic space according to the location change parameter, and determining the viewing-angle adjustment parameter of the panoramic image in the panoramic space according to the posture change parameter.

The sending the adjustment parameter to the smart television, so that the smart television adjusts the panoramic image according to the adjustment parameter includes:

sending the viewpoint adjustment parameter and the viewing-angle adjustment parameter to the smart television, so that the smart television adjusts a viewpoint of the panoramic image according to the viewpoint adjustment parameter and adjusts a viewing angle of the panoramic image according to the viewing-angle adjustment parameter.

In the embodiments, the description parameter of the mobile terminal in the three-dimensional space includes the location change parameter and the posture change parameter. The mobile terminal sends the location change parameter and the posture change parameter to the media content server. The media content server determines the viewpoint adjustment parameter according to the location change parameter, determines the viewing-angle adjustment parameter according to the posture change parameter, and sends the viewpoint adjustment parameter and the viewing-angle adjustment parameter to the smart television. The smart television adjusts the viewpoint of the panoramic image according to the viewpoint adjustment parameter, and adjusts the viewing angle of the panoramic image according to the viewing-angle adjustment parameter.

Figure 7:
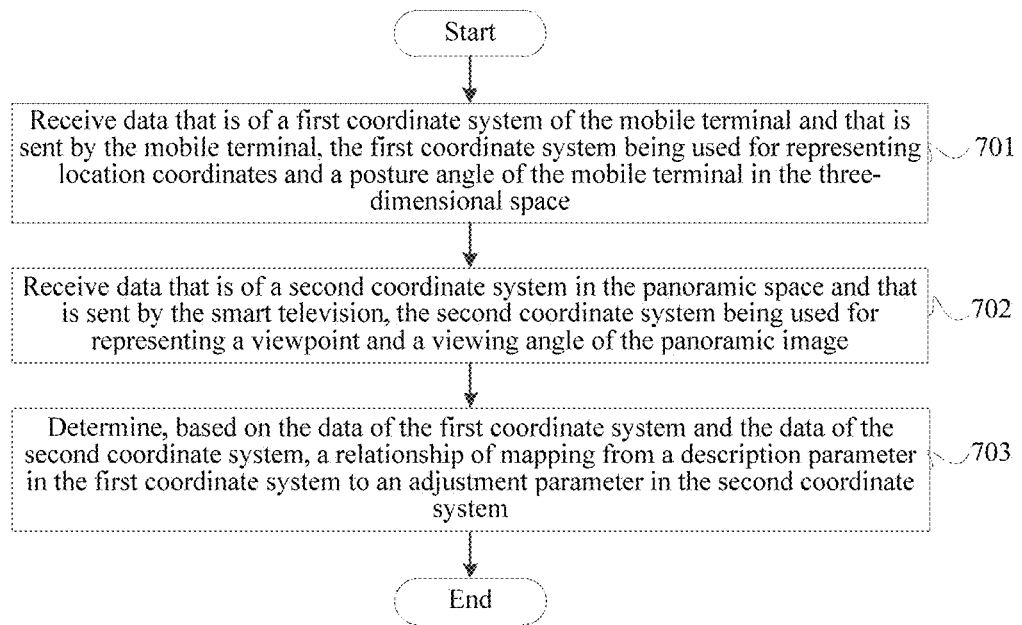
FIG. 7 is a schematic flowchart of matching a space coordinate system with a panoramic coordinate system according to an embodiment.

In some embodiments, the method for presenting and controlling a panoramic image provided in this application further includes: matching a coordinate system of the mobile terminal in the three-dimensional space with a panorama coordinate system in the panoramic space, to determine a relationship of mapping from the location change parameter and/or the posture change parameter of the mobile terminal in the three-dimensional space to the viewing-angle adjustment parameter and/or the viewpoint adjustment parameter of the panoramic image. As shown in FIG. 7, the following steps are mainly included:

Step 701. Receive data that is of a first coordinate system of the mobile terminal and that is sent by the mobile terminal, a parameter obtained by using the first coordinate system being used for representing location coordinates and a posture angle of the mobile terminal in the three-dimensional space.

Figure 8:
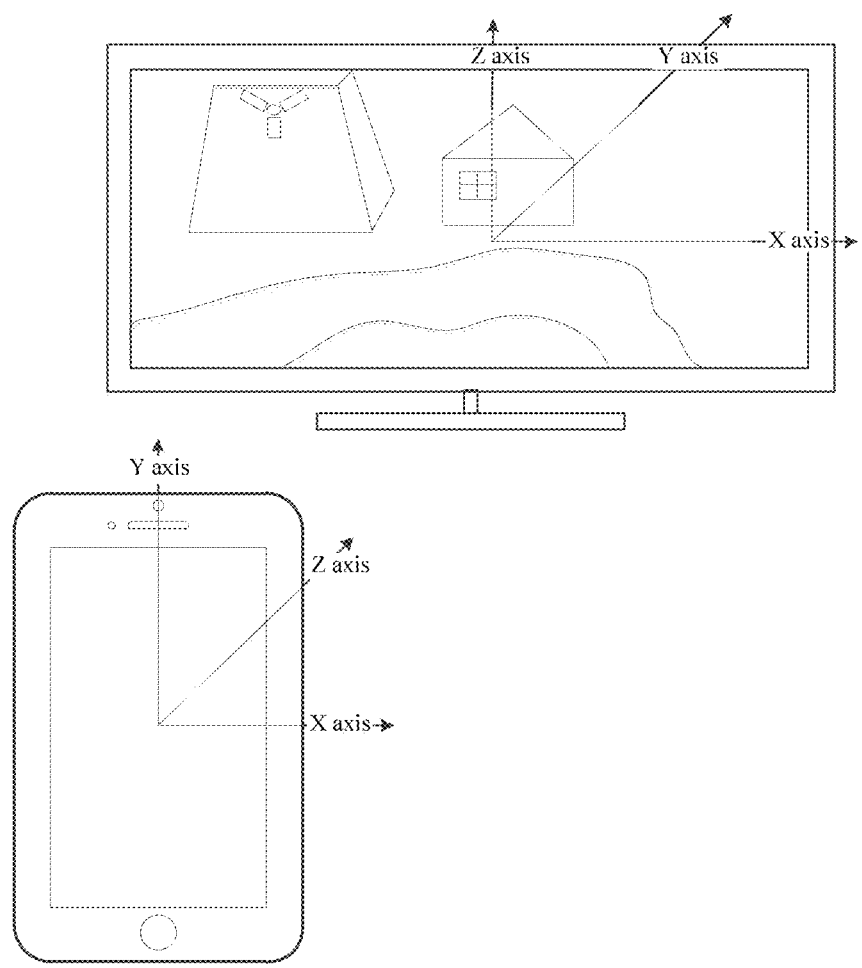
FIG. 8 is a schematic diagram of a space coordinate system and a panoramic space coordinate system according to an embodiment.

The mobile terminal establishes the first coordinate system in the three-dimensional space, the first coordinate system including three coordinate axes, that is, an X axis, a Y axis, and a Z axis, and selects one as a rotation axis of the mobile terminal. When the mobile terminal adjusts the smart television, the mobile terminal and the smart television are placed in parallel. The mobile terminal is provided with a gyroscope, and a gravity direction may be known according to the gyroscope. As shown in FIG. 8, an axis in which the gravity direction is located is defined as the Y axis, a plane perpendicular to the Y axis is defined as a horizontal plane, an axis on the horizontal plane that is parallel to a screen of the smart television is defined as the X axis, and an axis perpendicular to the X axis and pointing to a television plane is defined as the Z axis. The X axis represents a movement distance of the mobile terminal in a left-right direction, the Y axis represents a movement distance of the mobile terminal in an up-down direction, and the Z axis represents a movement distance of the mobile terminal in a front-rear direction, and also represents a distance between the mobile terminal 101 and the smart television 102. In addition, the first reference point is determined, and the location change parameter of the mobile terminal is with respect to the first reference point. The first reference point is an initial location at which the mobile terminal begins to adjust the smart television. In some embodiments, the coordinate origin of the first coordinate system may be defined as the first reference point, so that when the location change parameter of the mobile terminal is determined, a location coordinate parameter of the mobile terminal may be directly used as the location change parameter, thereby reducing a computing amount. When the mobile terminal adjusts a panoramic image on the smart television, at a fixed location, the mobile terminal may control a posture of the mobile terminal through rotation, and control a viewing angle of the panoramic image at a viewpoint according to a change of the posture. When the panoramic image is a 360-degree panoramic image, different viewing angles of the panoramic image may be controlled by rotating the mobile terminal in a plane. When the panoramic image is a 720-degree panoramic image, different viewing angles of the panoramic image may be controlled by rotating the mobile terminal in two planes. In some embodiments, any one of the X axis, the Y axis, and the Z axis is used as a rotation axis. In some embodiments, a rotation angle of the mobile terminal at the first reference point is set to 0 degrees, and when the posture change parameter is determined, the rotation angle of the mobile terminal at the location is directly used as the posture change parameter, thereby reducing a computing amount. The data of the first coordinate system mainly includes the three coordinate axes, the coordinate origin, the first reference point, and the rotation axis of the mobile terminal.

Step 702. Receive data that is of a second coordinate system in the panoramic space and that is sent by the smart television, a parameter obtained by using the second coordinate system being used for representing a viewpoint and a viewing angle of the panoramic image.

The second coordinate system is established in the panoramic space, and a photographing start point of the panoramic image is defined as the second reference point. In some embodiments, the origin of the coordinate system in the panoramic space is defined as the second reference point (where the second reference point overlaps the second coordinate system). The panoramic image is on a vertical plane of a television screen by default, an axis parallel to a horizontal plane is an X axis, an axis perpendicular to the horizontal plane is a Y axis, and an axis perpendicular to the plane of the television screen is a Z axis. The X axis represents a movement distance of a viewpoint in a left-right direction, the Y axis represents a movement distance of the viewpoint in an up-down direction, and the Z axis represents a movement distance of the viewpoint in a front-rear direction. If the panoramic image is a 360-degree panoramic image, an angle parameter is used for representing the viewing angle. If the panoramic image is a 720-degree panoramic image, two angle parameters are used for representing the viewing angle. The data of the second coordinate system includes the three coordinate axes of the second coordinate system, the coordinate origin, the second reference point, and an angle representing the viewing angle.

Step 703. Determine, according to the data of the first coordinate system and the data of the second coordinate system, a relationship of mapping from a description parameter in the first coordinate system to an adjustment parameter in the second coordinate system. The description parameter includes the location change parameter and/or the posture change parameter, and the adjustment parameter includes the viewpoint adjustment parameter and/or the viewing-angle adjustment parameter.

The media content server receives the data that is of the coordinate system in the panoramic space and that is sent by the smart television and the data that is of coordinate system in the three-dimensional space and that is sent from the mobile terminal, and matches the second coordinate system in the panoramic space with the first coordinate system of the mobile terminal. The first reference point of the first coordinate system corresponds to the second reference point of the second coordinate system, the X, Y, and Z axes of the first coordinate system respectively correspond to the X, Y, and Z axes of the second coordinate system. That is, movement of the mobile terminal in the left-right direction corresponds to movement of the viewpoint in the left-right direction, movement of the mobile terminal in the up-down direction corresponds to movement of the viewpoint in the up-down direction, movement of the mobile terminal in the front-rear direction corresponds to movement of the viewpoint in the front-rear direction, and when the viewpoint is moved in the front-rear direction, a visual effect of enlarging and reducing the panoramic image is gained. The rotation angle of the mobile terminal corresponds to the viewing angle of the panoramic image. When the panoramic image is a 360-degree panoramic image, a rotation angle of the mobile terminal in a plane corresponds to a viewing angle of the panoramic image within a range of 360 degrees. When the panoramic image is a 720-degree panoramic image, a rotation angle of the mobile terminal in the three-dimensional space is decomposed into rotation angles in two planes, and the rotation angles in the two planes correspond to a viewing angle of the panoramic image within a range of 720 degrees. In addition, the mapping relationship further includes a correspondence between scales of the first coordinate system and the second coordinate system, a correspondence between scales of three-dimensional space and scales of coordinates in the panoramic space is determined according to a distance by which the user can move the mobile terminal by using an arm in an up-down, left-right, and front-rear direction, rotation angles by which the can rotate the mobile terminal 101 by using an arm, and distance ranges and viewing angle ranges within which the viewpoint of the panoramic image can move in the left-right, up-down, and front-rear direction. For example, the mobile terminal 101 is moved by a distance a in an up-down direction, the panoramic image is correspondingly moved by a1 in the up-down direction, a and a1 have a linear proportional relationship, and a value of a ratio depends on a distance range within which the arm of the user can move in the up-down direction and a distance range within which the viewpoint of the panoramic image can move in the up-down direction. The mobile terminal 101 is moved by a distance b in a left-right direction, the viewpoint of the panoramic image is correspondingly moved by b1 in the left-right direction, b and b1 have a linear proportional relationship, and a value of a ratio depends on a distance range within which the arm of the user can move in the left-right direction and a distance range within which the viewpoint of the panoramic image can move in the left-right direction. The mobile terminal 101 is moved by a distance c in a front-rear direction, the viewpoint of the panoramic image is correspondingly moved by c1 in the front-rear direction, c and c1 have a linear proportional relationship, and a value of a ratio depends on a distance range within which the arm of the user can move in the front-rear direction and a distance range within which the viewpoint of the panoramic image can move in the front-rear direction. If the mobile terminal is rotated by an angle θ, the viewing angle of the panoramic image changes by θ1, θ and θ1 have a linear proportional relationship, and a value of a ratio depends on an angle range within which the arm of the user can rotate and a viewing angle range of the panoramic image.

In some embodiments, in step 204, the determining an adjustment parameter of the panoramic image in panoramic space according to the description parameter includes: determining the adjustment parameter according to the mapping relationship and the description parameter.

The mobile terminal 101 sends the obtained location change parameter and posture change parameter to the media content server 103. The media content server 103 determines the adjustment parameter for the panoramic image according to the obtained location change parameter and posture change parameter of the mobile terminal 101 in the space coordinate system and according to the foregoing determined relationship of mapping from the location change parameter and/or the posture change parameter in the first coordinate system in the three-dimensional space to the viewing-angle adjustment parameter and/or the viewpoint adjustment parameter in the panoramic space. In some embodiments, when the first reference point is defined as the coordinate origin of the first coordinate system, a rotation angle of the mobile terminal at an initial posture is defined as 0 degrees. For example, as shown in FIG. 8, a rotation angle of the mobile terminal at a posture in FIG. 8 is defined as 0 degrees. The second reference point may be defined as the coordinate origin of the second coordinate system (the second reference point overlaps the coordinate origin of the second coordinate system), and an initial viewing angle of the panoramic image presented on the smart television is defined as 0 degrees. When the first reference point is set to the origin of the first coordinate system, and the rotation angle of the mobile terminal at the initial location is set to 0 degrees, the location change parameter and the posture change parameter are location coordinates and a rotation angle of the mobile terminal at the current location. When the second reference point is set to the origin of the second coordinate system, and the rotation angle of the panoramic image initially presented on the mobile terminal is set to 0 degrees, the viewing-angle adjustment parameter and the viewpoint adjustment parameter are a viewing angle and a viewpoint of the panoramic image. According to the mapping relationship determined in the foregoing step, a viewpoint corresponding to the coordinates of the current location of the mobile terminal is determined, and a viewing angle of the panoramic image that corresponds to the rotation angle of the mobile terminal at the current location is determined. The media content server sends the determined viewpoint and viewing angle to the smart television, and the smart television presents the panoramic image having the determined viewpoint and viewing angle.

In some embodiments, the method for presenting and controlling a panoramic image provided in this application further includes: binding the mobile terminal with the smart television. In this way, the mobile terminal can be bound with the smart television by using a pattern identification code, and the mobile terminal scans a pattern identification code on the smart television to establish a binding. Specifically, the following steps are included:

Step S11. Generate a pattern identification code carrying an identifier of the smart television, and send the pattern identification code to the smart television, so that the smart television presents the pattern identification code.

Figure 9:
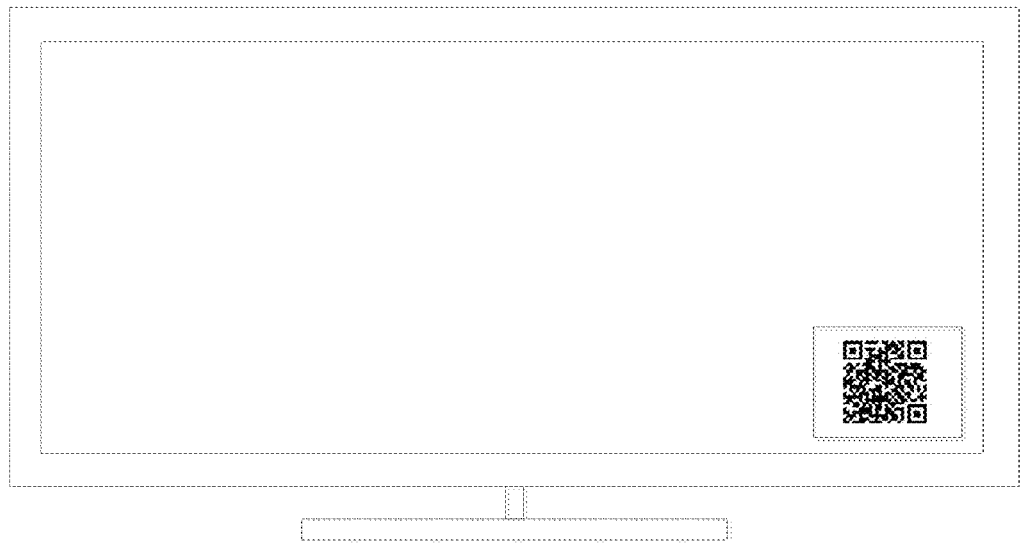
FIG. 9 is a schematic diagram of presenting a pattern identification code on a smart television according to an embodiment.

The media content server 103 generates the pattern identification code carrying the identifier of the smart television, and sends the pattern identification code to the smart television, so that the smart television presents the pattern identification code. As shown in FIG. 9, the pattern identification code may be a two-dimensional code carrying the identifier of the smart television. The smart television may display the pattern identification code on a display apparatus, for example, on a display screen, of the smart television.

Step S12. Receive a binding request message sent by the mobile terminal after the mobile terminal identifies the pattern identification code, the binding request message carrying an identifier of the mobile terminal and the identifier of the smart television.

The mobile terminal scans the pattern identification code on the smart television for identification. The mobile terminal may scan the pattern identification code by using a scanning function of the mobile terminal, or may scan the pattern identification code by using a scanning function carried by a client on the mobile terminal. After the pattern identification code is successfully identified, the mobile terminal sends a binding request message to the media content server 103, the binding request message including the identifier of the mobile terminal and the identifier of the smart television.

Step S13. Establish a correspondence between the identifier of the mobile terminal and the identifier of the smart television.

After receiving the binding request message, the media content server 103 establishes a correspondence between the identifier of the mobile terminal and the identifier of the smart television, and stores the correspondence. In addition, the media content server 103 sends a binding success message to the smart television, and presents the binding success message on the smart television. If the mobile terminal fails to identify the pattern identification code, the mobile terminal sends a binding identification message to the media content server 103, and the media content server 103 sends the binding identification message to the smart television for presentation. The smart television refreshes the pattern identification code, and displays prompt information prompting code re-scanning.

In some embodiments, in step 202, the sending the panoramic image trigger instruction to a smart television bound with the mobile terminal includes the following steps:

Step S21. Determine, according to the correspondence, the identifier of the smart television that corresponds to the identifier of the mobile terminal.

In the foregoing step, the media content server 103 has established and stored the correspondence between the identifier of the mobile terminal 101 and the identifier of the smart television 102. After receiving the panoramic image trigger instruction, the panoramic image trigger instruction including the identifier of the mobile terminal sending the instruction, the media content server 103 searches, according to the identifier of the mobile terminal, the stored correspondence for the identifier of the smart television that corresponds to the identifier of the mobile terminal.

Step S22. Send the panoramic image trigger instruction to a smart television corresponding to the identifier of the smart television.

After finding the identifier of the smart television, the media content server 103 sends the panoramic image trigger instruction to a smart television corresponding to the identifier of the smart television, so that the smart television presents the panoramic image corresponding to the currently presented media content.

In some embodiments, the method for presenting and controlling a panoramic image provided in this application further includes: synchronously presenting the panoramic image on the mobile terminal and the smart television. For example, the mobile terminal may be used as a sub-screen for convenience of viewing by the user. The following steps are mainly included:

Step S31. Receive the currently presented panoramic image data sent by the smart television.

The mobile terminal and the smart television synchronously present the panoramic image. The smart television may send the currently presented panoramic image to the media content server in real time, and the media content server sends the received panoramic image to the mobile terminal, so that the mobile terminal and the smart television synchronously present the panoramic image.

Step S32. Send the currently presented panoramic image data to the mobile terminal, so that the mobile terminal and the smart television synchronously present the panoramic image.

Figure 10:
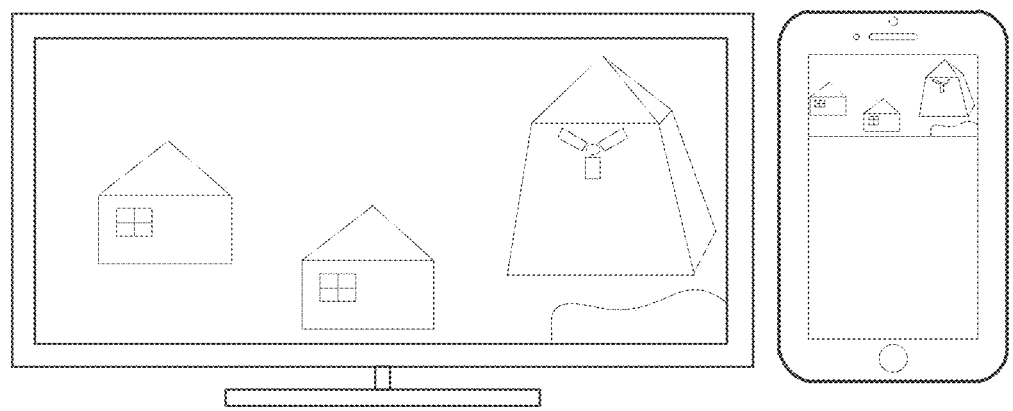
FIG. 10 is a schematic diagram of synchronously presenting a panoramic image on a mobile terminal and a smart television according to an embodiment.

As shown in FIG. 10, the mobile terminal and the smart television synchronously display the panoramic image, and the panoramic image is synchronously presented on the mobile terminal. On one hand, a presentation apparatus of the mobile terminal may be used as a sub-screen, and on the other hand, some interaction may be facilitated. For example, when the panoramic image is a panoramic video, a progress bar for playing the panoramic video may be controlled on the mobile terminal.

In some embodiments, the method for presenting and controlling a panoramic image provided in this application further includes: independently adjusting, by the mobile terminal, the panoramic image presented on the mobile terminal, instead of receiving in real time an adjusted panoramic image sent by the smart television. After step 204, the method mainly further includes: sending the adjustment parameter of the panoramic image to the mobile terminal, so that the mobile terminal adjusts the viewing angle and/or the viewpoint of the panoramic image according to the adjustment parameter.

Alternatively, after receiving a panoramic image play acknowledgment message sent by the media content server, the smart television may send the panoramic image data to the media content server, and the media content server sends the panoramic image data to the mobile terminal, to present an initial panoramic image on the mobile terminal using an application. In some embodiments, alternatively, the panoramic image may be presented on a panoramic image web page (for example, an H5 page) that is presented on the mobile terminal, and the panoramic image may be a panoramic image that has not been adjusted. After a trigger request that is sent by the mobile terminal and that is for independently adjusting the panoramic image is received, for a received current panoramic image that is presented on the smart television, the mobile terminal may independently adjust the panoramic image during subsequent adjustment. When the media content server 103 subsequently sends the adjustment parameter of the panoramic image to the smart television, the mobile terminal 101 may adjust, according to the adjustment parameter, the panoramic image presented on the mobile terminal 101. The media content server 103 may alternatively send, to the mobile device for presentation, the panoramic image determined according to the adjustment parameter. The mobile terminal 101 and the smart television synchronously present the panoramic image, and synchronously adjust the panoramic image.

In some embodiments, in the method for presenting and controlling a panoramic image provided in this application, the panoramic image includes a target object, and the target object may be a coupon on an advertisement image, or an enemy, a key, a prop, or the like in a panoramic image in a game.

The method further includes the following steps:

Step S41. Determine prompt information according to the adjustment parameter and a location of the target object, the prompt information being used for prompting to operate the mobile terminal. When this step is performed, the prompt information is determined according to the viewing-angle adjustment parameter and/or the viewpoint adjustment parameter and the location of the target object, the prompt information being used for prompting to move and/or the rotate the mobile terminal.

Figure 11:
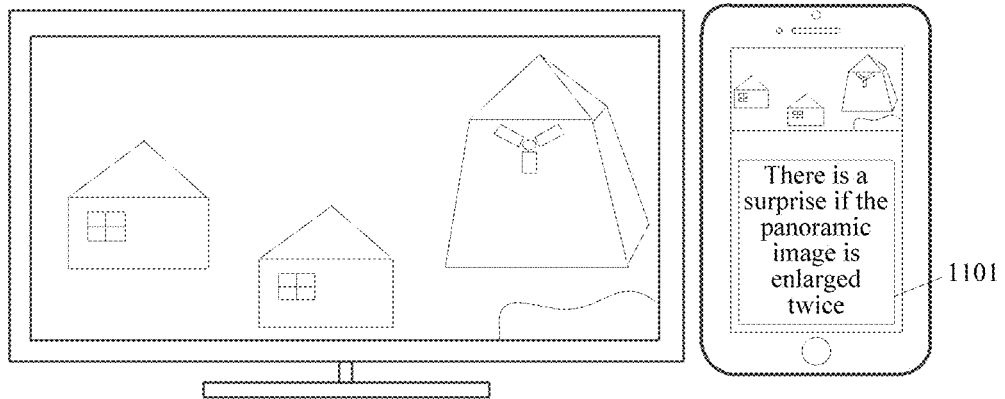
FIG. 11 is a schematic diagram of presenting prompt information by a mobile terminal while synchronously presenting a panoramic image according to an embodiment.

When the mobile terminal and the smart television synchronously present the panoramic image, a provider of the panoramic image may set a target object in the panoramic image. The media content server determines the prompt information according to the location of the target object and the panoramic image currently presented on the smart television, the prompt information being used for helping the user find the target object in the panoramic image. For example, for a panoramic image of an advertisement, the mobile terminal and the smart television synchronously present the panoramic image. If the current panoramic image is enlarged twice, the user can find a target object. In this case, a video server sends, to the mobile terminal for presentation, prompt information indicating that the current panoramic image is enlarged twice. As shown in FIG. 11, the mobile terminal presents a panoramic image of an advertisement, and the advertisement is an advertisement of a resort. In addition, the mobile terminal presents prompt information 1101, the prompt information 1101 being used for informing the user that there is a surprise if the panoramic image is enlarged twice again.

Step S42. Send the prompt information to the mobile terminal for presentation, so that the user moves and/or rotates the mobile terminal according to the prompt information.

Figure 12:
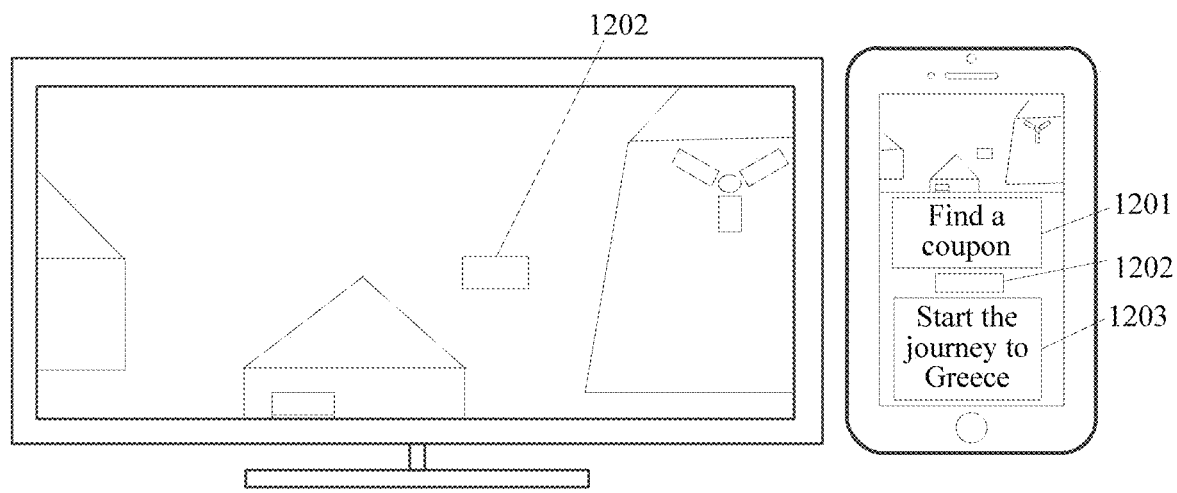
FIG. 12 is a schematic diagram of finding a target object by a user after the user adjusts a mobile terminal according to prompt information according to an embodiment.

Still as shown in the foregoing example, the mobile terminal presents prompt information, and the prompt information is: there is a surprise if the panoramic image is enlarged twice again. The user moves the mobile terminal close to the smart television. After the panoramic image is enlarged twice, as shown in FIG. 12, a coupon 1202 is found on the smart television 102, and the mobile terminal synchronously displays the coupon 1202, and also presents prompt information 1201 for finding the coupon. The user may tap a key 1203, that is, a key (control) of "start the journey to Greece" in FIG. 12, on the mobile terminal to buy a discounted airline ticket, and may further perform interaction such as sharing.

Figure 13:
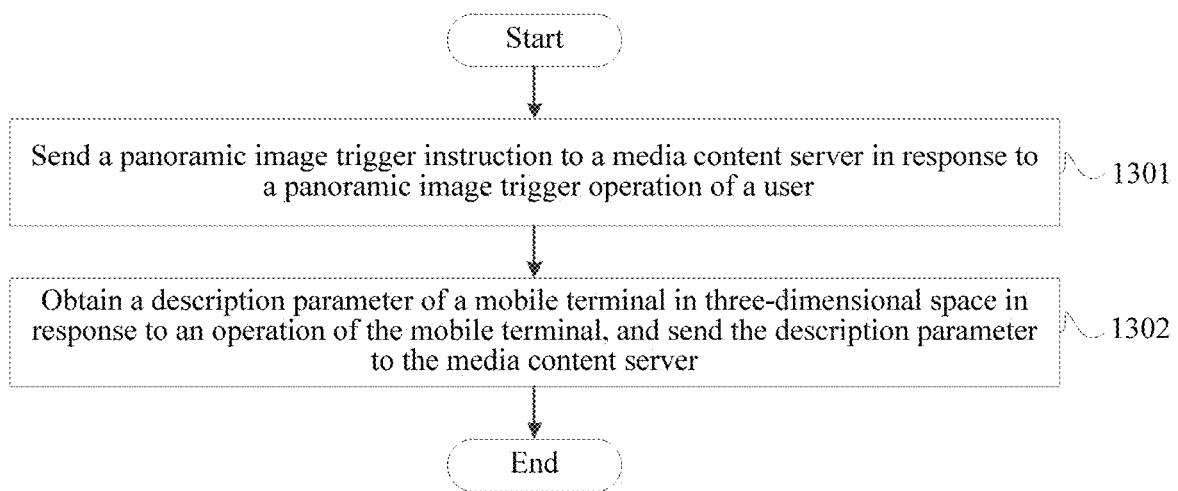
FIG. 13 is a flowchart of a method for presenting and controlling a panoramic image applied to a mobile terminal side according to an embodiment.

This application further provides a method for presenting and controlling a panoramic image, applied to the mobile terminal 101. As shown in FIG. 13, the method mainly includes the following steps:

Step 1301. Send a panoramic image trigger instruction to a media content server in response to a panoramic image trigger operation, so that the media content server sends the panoramic image trigger instruction to a smart television bound with the mobile terminal, and the smart television presents a panoramic image corresponding to currently presented media content.

Step 1302. Obtain a description parameter of the mobile terminal in three-dimensional space in response to an operation of the mobile terminal, and send the description parameter to the media content server, so that the media content server determines an adjustment parameter of the panoramic image in panoramic space according to the description parameter and sends the adjustment parameter to the smart television, and the smart television adjusts the panoramic image according to the adjustment parameter.

According to the method for presenting and controlling a panoramic image provided in this application, a viewpoint and a viewing angle of a panoramic image on the smart television are adjusted according to a location change and a posture change of the mobile terminal in the three-dimensional space. In this way, the panoramic image is more flexibly adjusted in more dimensions. In addition, a user can view the panoramic image naturally, just like the user carries a camera to move in any direction to take a video.

In some embodiments, the description parameter includes a location change parameter and a posture change parameter, and the adjustment parameter includes a viewing-angle adjustment parameter and a viewpoint adjustment parameter.

The obtaining a description parameter of the mobile terminal in three-dimensional space in response to an operation of the mobile terminal includes:

obtaining the location change parameter in response to a movement operation of the mobile terminal, and obtaining the posture change parameter in response to a rotation operation of the mobile terminal.

The sending the description parameter to the media content server, so that the media content server determines an adjustment parameter of the panoramic image in panoramic space according to the description parameter and sends the adjustment parameter to the smart television, and the smart television adjusts the panoramic image according to the adjustment parameter includes:

sending the location change parameter and the posture change parameter to the media content server, so that the media content server determines a viewpoint adjustment parameter of the panoramic image in the panoramic space according to the location change parameter, determines a viewing-angle adjustment parameter of the panoramic image in the panoramic space according to the posture change parameter, and sends the viewpoint adjustment parameter and the viewing-angle adjustment parameter to the smart television, and the smart television adjusts a viewpoint of the panoramic image according to the viewpoint adjustment parameter and adjusts a viewing angle of the panoramic image according to the viewing-angle adjustment parameter.

In some embodiments, the responding to a panoramic image trigger operation of the user in step 1301 includes: responding to a selection operation of the user for an option of a presented panoramic image, or may include identifying a pattern identification code on the smart television bound with the mobile terminal.

First, the mobile terminal 101 establishes a binding with the smart television 102. The panoramic image trigger instruction may be a binding acknowledgment instruction sent by the mobile terminal 101 to the media content server 103 after the mobile terminal 101 is successfully bound with the smart television 102. For example, the mobile terminal is bound with the smart television by scanning a pattern identification code presented on the smart television. When the mobile terminal scans and identifies the pattern identification code, the mobile terminal sends the panoramic image trigger instruction to the media content server. After receiving the panoramic image trigger instruction, the media content server 103 sends a panoramic image presentation instruction to the smart television 102, so that the smart television presents a panoramic image. In some embodiments, after the mobile terminal 101 is bound with the smart television 102, a web page of a panoramic image is automatically opened on the mobile terminal, and the panoramic image is synchronously presented on the web page of the panoramic image and on the smart television.

In some embodiments, the panoramic image trigger instruction may alternatively be implemented in another manner. For example, the smart television 102 sends a panoramic image play request to the media content server 103, and the media content server sends the play request to the mobile terminal, to determine, according to a selection of a user, whether to present a panoramic image. Presentation of a panoramic image of an advertisement is used as an example. When the smart television 102 is to present an advertisement, the smart television 102 sends a panoramic image presentation request to the media content server 103, and the media content server 103 sends, to the mobile terminal 101, prompt information indicating whether to present a panoramic image. As shown in FIG. 3, the mobile terminal 101 presents the prompt information 301 on a video application installed on the mobile terminal 101 and also presents a Yes option 302 and a No option 303. When the user selects the option 302, the mobile terminal 101 sends a presentation acknowledgment message to the media content server 103, and the media content server 103 sends the presentation acknowledgment message to the smart television 102, so that the smart television presents the panoramic image of the advertisement. The panoramic image may be a panoramic picture or a panoramic video. When the user selects the option 303, the mobile terminal 101 does not send a presentation acknowledgment message to the media content server 103, and correspondingly, the smart television 102 does not present the panoramic image.

In some embodiments, in step 1302, the location change parameter of the mobile terminal 101 in the three-dimensional space may be obtained through indoor positioning. Specifically, the location change parameter may be obtained through Wi-Fi indoor positioning or Bluetooth indoor positioning. Specifically, for the Wi-Fi indoor positioning, the mobile terminal may be positioned by using a wireless signal strength of a wireless network access point that is received by the mobile terminal. Coordinates of a Wi-Fi hotspot are known, the mobile terminal receives a signal strength from the Wi-Fi hotspot, and the signal strength has a specific relationship with a distance between the Wi-Fi hotspot and the mobile device. Therefore, the distance between the mobile terminal and the Wi-Fi hotspot may be obtained by using the strength of the signal. According to distances between the mobile device and more than three Wi-Fi hotspots, coordinates of the mobile terminal may be determined. M network access points are disposed in the three-dimensional space, M being greater than or equal to 3.

The obtaining a description parameter of the mobile terminal in three-dimensional space includes the following steps:

Step S51. Dispose M network access points, M being greater than or equal to 3. The M network access points are disposed in the three-dimensional space.

Step S52. Respectively determine coordinates of a reference point location and coordinates of a current location according to M wireless signal strengths that are of the M network access points and that are respectively received by the mobile terminal at the reference point location and the current location, that is, respectively determine the coordinates of the reference point location and the coordinates of the current location according to the M wireless signal strengths that are of the M network access points and that are received by the mobile terminal at the reference point location and the M wireless signal strengths that are of the M network access points and that are received by the mobile terminal at the current location.

Step S53. Determine a location change parameter of the mobile terminal in the three-dimensional space according to the coordinates of the reference point location and the coordinates of the current location.

In some embodiments, in step 1302, when the location change parameter of the mobile terminal in the three-dimensional space is obtained, the mobile terminal 101 may obtain the location change parameter in another manner of the Wi-Fi indoor positioning, which is similar to fingerprint identification. A plurality of semantic locations is defined, and a Wi-Fi signal is collected for each semantic location to form a "fingerprint database". During positioning, a Wi-Fi signal measured by the mobile terminal is compared with a Wi-Fi signal already existing in the "fingerprint database", to determine a Wi-Fi signal at a location in the database that best matches this new signal. In this case, it may be considered that the mobile terminal is most possibly at the location. Specifically, the following steps are mainly included:

Step S61. Determine wireless signal strengths of a network access point that are received by the mobile terminal at a plurality of locations, and store coordinates of each location and a corresponding wireless signal strength in an associated manner.

Step S62. Determine a first wireless signal strength and a second wireless signal strength that are of a network access point and that are respectively received by the mobile terminal at a reference point location and at a current location, separately search the stored wireless signal strengths for wireless signal strengths closest to the first wireless signal strength and the second wireless signal strength, and use location coordinates of locations corresponding to the found wireless signal strengths respectively closest to the first wireless signal strength and the second wireless signal strength as coordinates of the reference point location and coordinates of the current location.

Step S63. Determine a location change parameter of the mobile terminal in the three-dimensional space according to the coordinates of the reference point location and the coordinates of the current location.

In some embodiments, the Bluetooth indoor positioning may alternatively be used. In the Bluetooth indoor positioning, several Bluetooth local area network access points are disposed indoors, to enable a network to be in a basic network connection mode based on a plurality of users, and ensure that the Bluetooth local area network access points are always primary devices in this micronet. Then, triangle positioning is performed on a newly added blind node by measuring a signal strength.

The user may randomly move the mobile terminal upward, downward, leftward, rightward, upward to the left, downward to the right, or the like, may rotate, push, pull the mobile terminal, or may push, pull, and/or rotate the mobile terminal while moving the mobile terminal upward, downward, leftward, rightward, upward to the left, downward to the left, upward to the right, downward to the right, or the like. The location change parameter of the mobile terminal 101 may be determined according to previous location coordinates and current location coordinates of the mobile terminal. The previous location coordinates and the current location coordinates of the mobile terminal may be obtained through the Wi-Fi indoor positioning or the Bluetooth indoor positioning. The location change parameter of the mobile terminal in the three-dimensional space is determined according to coordinates of a reference point location and coordinates of a current location of the mobile terminal 101.

In some embodiments, in step 1302, when the posture change parameter of the mobile terminal in the three-dimensional space is obtained, the mobile terminal 101 is provided with a gyroscope, and the gyroscope may provide a gravity direction, that is, a vertical direction. A reference point deflection angle and a current deflection angle of the mobile terminal are separately determined according to a sensor parameter obtained from the gyroscope, and the posture change parameter of the mobile terminal 101 is determined according to the reference point deflection angle and the current deflection angle of the mobile terminal 101. Specifically, the following steps are mainly included:

Step S71. Separately determine a reference point deflection angle and a current deflection angle of the mobile terminal according to a sensor parameter obtained from a gyroscope.

Step S72. Determine the posture change parameter of the mobile terminal according to the reference point deflection angle and the current deflection angle of the mobile terminal.

In addition, in some embodiments, after determining the location change parameter and/or the posture change parameter, the mobile terminal may present the location change parameter and/or the posture change parameter. An interface of the mobile terminal presents data of an angle change, a location change, and the like according to an operation such as rotation or movement. For example, if the mobile terminal is rotated counter-clockwise by 30 degrees, the value −30 degrees is correspondingly displayed; if the mobile terminal 101 is moved leftward by a distance of X, −X is correspondingly displayed on the mobile phone; if the mobile terminal is directly moved upward to the left, which is decomposed into moving leftward by a distance of X and upward by Y, the data (−X, Y) is correspondingly displayed. Movement in another direction in the three-dimensional space is similar.

In some embodiments, the method for presenting and controlling a panoramic image provided in this application further includes: synchronously presenting the panoramic image on the mobile terminal and the smart television, a presentation device of the mobile terminal is used as a sub-screen for convenience of viewing by the user. This mainly includes: receiving panoramic image data that is sent by the media content server and that is currently presented on the smart television, and presenting the panoramic image.

The mobile terminal and the smart television synchronously present the panoramic image. The smart television may send the currently presented panoramic image to the media content server in real time, and the media content server sends the received panoramic image to the mobile terminal, so that the mobile terminal and the smart television synchronously present the panoramic image. As shown in FIG. 10, the mobile terminal and the smart television synchronously present the panoramic image, and the panoramic image is synchronously presented on the mobile terminal. On one hand, a presentation apparatus of the mobile terminal may be used as a sub-screen, and on the other hand, some interaction may be facilitated. For example, when the panoramic image is a panoramic video, a progress bar for playing the panoramic video may be controlled on the mobile terminal.

In some embodiments, the method for presenting and controlling a panoramic image provided in this application further includes: independently adjusting, by the mobile terminal, the panoramic image presented on the mobile terminal, instead of receiving in real time an adjusted panoramic image sent by the smart television. After step 1301 the method mainly further includes the following steps:

Step S81. Receive the adjustment parameter sent by the media content server.

Alternatively, after receiving a panoramic image play acknowledgment message sent by the media content server, the smart television may send the panoramic image data to the media content server, and the media content server sends the panoramic image data to the mobile terminal, to present an initial panoramic image on the mobile terminal using an application. In some embodiments, alternatively, the panoramic image may be presented on a panoramic image web page on the mobile terminal, and the panoramic image may be an adjusted panoramic image. In some embodiments, alternatively, after a trigger request that is sent by the user and that is for independently adjusting the panoramic image is received, for a received current panoramic image that is presented on the smart television, the mobile terminal may independently adjust the panoramic image during subsequent adjustment.

Step S82. Adjust the panoramic image according to the adjustment parameter, that is, adjust the viewing angle of the panoramic image according to the viewing-angle adjustment parameter and adjust the viewpoint of the panoramic image according to the viewpoint adjustment parameter.

When subsequently sending the adjustment parameter to the smart television, the media content server 103 further sends the adjustment parameter to the mobile terminal, and the mobile terminal adjust, according to the adjustment parameter, the viewpoint and the viewing angle of the panoramic image presented on the mobile terminal. The mobile terminal 101 and the smart television synchronously present the panoramic image, and synchronously adjust the panoramic image.

In some embodiments, the method for presenting and controlling a panoramic image provided in this application further includes: receiving and presenting prompt information sent by the media content server, the prompt information being used for prompting the user of the mobile terminal to operate (move or rotate) the mobile terminal, so that the user moves or rotates the mobile terminal according to the prompt information.

For example, for a panoramic image of an advertisement, the mobile terminal and the smart television synchronously present the panoramic image. The mobile terminal presents prompt information, the prompt information being used for informing the user that there is a surprise if the panoramic image is enlarged twice again. The user moves the mobile terminal close to the smart television. After the panoramic image is enlarged twice, as shown in FIG. 12, a coupon is found on the smart television 102, and the mobile terminal synchronously displays the coupon. The user may tap a key of "start the journey to Greece" on the mobile terminal to buy a discounted airline ticket, and may further perform interaction such as sharing.

Figure 14:
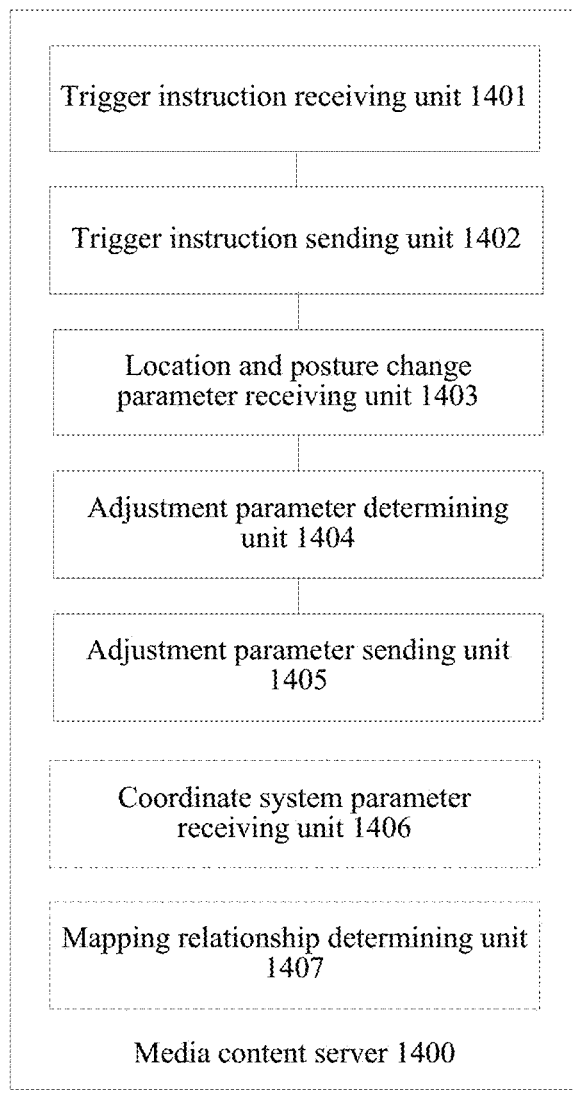
FIG. 14 is a schematic structural diagram of an apparatus for presenting and controlling a panoramic image applied to a server side according to an embodiment.

This application further provides an apparatus 1400 for presenting and controlling a panoramic image, applied to the media content server 103, and as shown in FIG. 14, including:

a trigger instruction receiving unit 1401, configured to receive a panoramic image trigger instruction sent by a mobile terminal;

a trigger instruction sending unit 1402, configured to send, in response to the received panoramic image trigger instruction, the panoramic image trigger instruction to a smart television bound with the mobile terminal, so that the smart television presents a panoramic image corresponding to currently presented media content;

a location and posture change parameter receiving unit 1403, configured to receive a location change parameter and/or a posture change parameter that is of the mobile terminal in three-dimensional space and that is sent by the mobile terminal;

an adjustment parameter determining unit 1404, configured to determine a viewing-angle adjustment parameter and/or a viewpoint adjustment parameter of the panoramic image in panoramic space according to the location change parameter and/or the posture change parameter; and an adjustment parameter sending unit 1405, configured to send the viewing-angle adjustment parameter and/or the viewpoint adjustment parameter to the smart television, so that the smart television adjusts a viewing angle and/or a viewpoint of the panoramic image according to the viewing-angle adjustment parameter and/or the viewpoint adjustment parameter.

According to the apparatus for presenting and controlling a panoramic image provided in this application, a viewpoint and a viewing angle of a panoramic image on the smart television are adjusted according to a location change and a posture change of the mobile terminal in the three-dimensional space, and the viewpoint and the viewing angle of the panoramic image may be simultaneously adjusted. In this way, the panoramic image is more flexibly adjusted in more dimensions. In addition, a user can view the panoramic image naturally, just like the user carries a camera to move in any direction to take a video.

In some embodiments, the apparatus 1400 further includes:

a coordinate system parameter receiving unit 1406, configured to receive data that is of a first coordinate system of the mobile terminal and that is sent by the mobile terminal, the first coordinate system being used for representing location coordinates and a posture angle of the mobile terminal in the three-dimensional space; and receive data that is of a second coordinate system in the panoramic space and that is sent by the smart television, the second coordinate system being used for representing a viewpoint and a viewing angle of the panoramic image, and different viewpoints and viewing angles corresponding to different panoramic images; and a mapping relationship determining unit 1407, configured to determine, according to the data of the first coordinate system and the data of the second coordinate system, a relationship of mapping from a location change parameter and/or a posture change parameter in the first coordinate system to a viewing-angle adjustment parameter and/or a viewpoint adjustment parameter in the second coordinate system.

The adjustment parameter determining unit 1404 is configured to determine the viewing-angle adjustment parameter and/or the viewpoint adjustment parameter according to the mapping relationship and the location change parameter and/or the posture change parameter.

Figure 15:
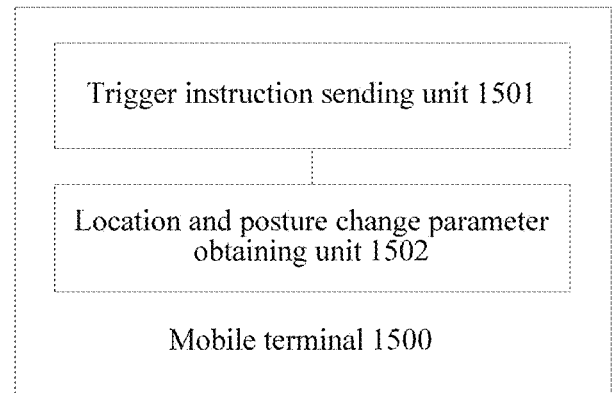
FIG. 15 is a schematic structural diagram of an apparatus for presenting and controlling a panoramic image applied to a mobile terminal side according to an embodiment.

This application further provides an apparatus 1500 for presenting and controlling a panoramic image, applied to the mobile terminal 101, and as shown in FIG. 15, including:

a trigger instruction sending unit 1501, configured to send a panoramic image trigger instruction to a media content server in response to a panoramic image trigger operation of a user, so that the media content server sends the panoramic image trigger instruction to a smart television, and the smart television presents a panoramic image corresponding to currently presented media content; and a location and posture change parameter obtaining unit 1502, configured to: obtain a location change parameter and/or a posture change parameter of the mobile terminal in three-dimensional space in response to a movement and/or rotation operation of the user, and send the location change parameter and/or the posture change parameter to the media content server, so that the media content server determines a viewing-angle adjustment parameter and/or a viewpoint adjustment parameter of the panoramic image in panoramic space according to the location change parameter and/or the posture change parameter and sends the viewing-angle adjustment parameter and/or the viewpoint adjustment parameter to the smart television, and the smart television adjusts a viewing angle and/or a viewpoint of the panoramic image according to the viewing-angle adjustment parameter and/or the viewpoint adjustment parameter.

According to the apparatus for presenting and controlling a panoramic image provided in this application, a viewpoint and a viewing angle of a panoramic image on the smart television are adjusted according to a location change and a posture change of the mobile terminal in the three-dimensional space, and the viewpoint and the viewing angle of the panoramic image may be simultaneously adjusted. In this way, the panoramic image is more flexibly adjusted in more dimensions. In addition, a user can view the panoramic image naturally, just like the user carries a camera to move in any direction to take a video.

In some embodiments, the location and posture change parameter obtaining unit 1502 is configured to:

dispose M network access points, M being greater than or equal to 3;

respectively determine coordinates of a reference point location and coordinates of a current location according to M wireless signal strengths that are of the M network access points and that are respectively received by the mobile terminal at the reference point location and the current location; and determine a location change parameter of the mobile terminal in the three-dimensional space according to the coordinates of the reference point location and the coordinates of the current location.

In some embodiments, the location and posture change parameter obtaining unit 1502 is configured to:

determine wireless signal strengths that are of a network access point and that are received at a plurality of locations, and store coordinates of each location and a corresponding wireless signal strength;

determine a first wireless signal strength and a second wireless signal strength that are of a network access point and that are received by the mobile terminal at a reference point location and at a current location, separately search the stored wireless signal strengths for wireless signal strengths closest to the first wireless signal strength and the second wireless signal strength, and use location coordinates of locations corresponding to the found wireless signal strengths respectively closest to the first wireless signal strength and the second wireless signal strength as coordinates of the reference point location and coordinates of the current location; and determine a location change parameter of the mobile terminal in the three-dimensional space according to the coordinates of the reference point location and the coordinates of the current location.

In some embodiments, the location and posture change parameter obtaining unit 1502 is configured to:

separately determine a reference point deflection angle and a current deflection angle of the mobile terminal according to a sensor parameter obtained from a gyroscope; and determine the posture change parameter of the mobile terminal according to the reference point deflection angle and the current deflection angle of the mobile terminal.

Figure 16:
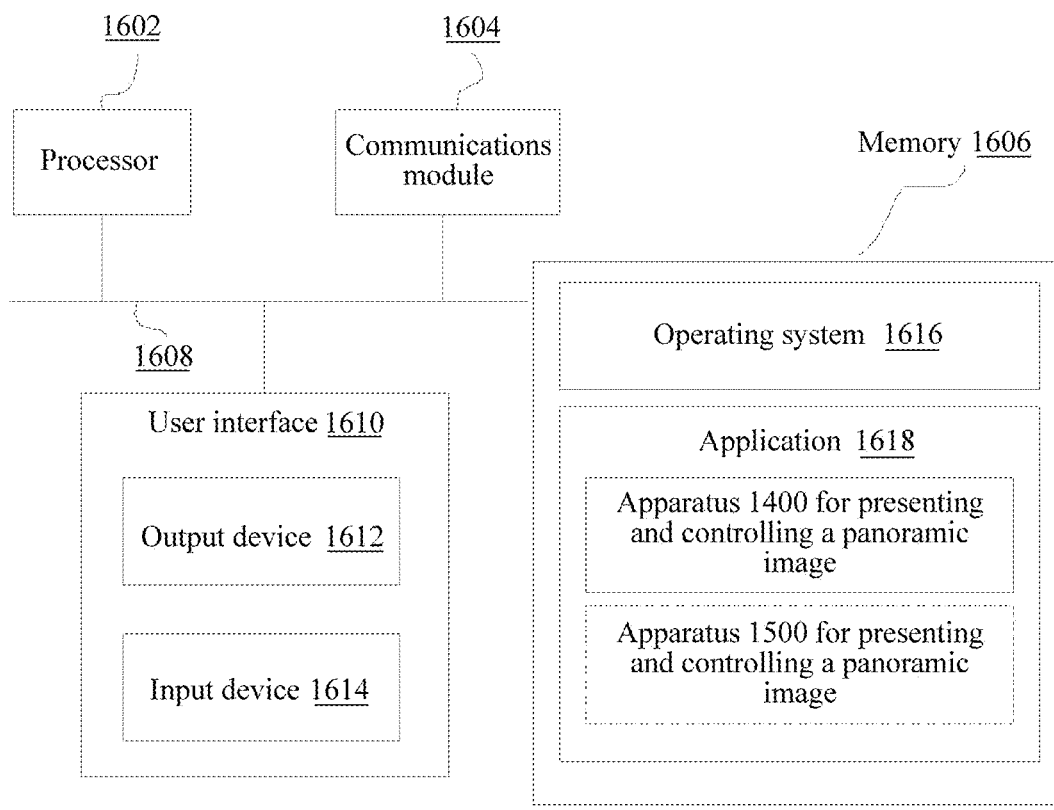
FIG. 16 is a schematic structural diagram of a computing device according to an embodiment.

FIG. 16 is a structural diagram of a computing device in which the apparatus 1400 for presenting and controlling a panoramic image and the apparatus 1500 for presenting and controlling a panoramic image are located. As shown in FIG. 16, the computing device includes one or more processors (CPU) 1602, a communications module 1604, a memory 1606, a user interface 1610, and a communications bus 1608 for interconnecting these components.

The processor 1602 may receive and send data by using the communications module 1604 to implement network communication and/or local communication.

The user interface 1610 includes one or more output devices 1612, including one or more speakers and/or one or more visualization displays. The user interface 1610 further includes one or more input devices 1614, including a keyboard, a mouse, a sound command input unit or a microphone, a touch display, a touch-sensitive input panel, a posture capturing camera, another input key or control, or the like.

The memory 1606 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 1606 stores an instruction set such as computer-readable instructions that can be executed by the processor 1602, to implement the steps in the method for presenting and controlling a panoramic image in this application, and implement functions of the modules of the apparatus for presenting and controlling a panoramic image in this application. The memory 1606 includes:

an operating system 1616, including a program used for processing various basic system services and for executing hardware-related tasks; and an application 1618, including various application programs used for presenting and controlling a panoramic image. The application programs can implement processing procedures in the foregoing embodiments, for example, may include some or all units in the apparatus 1400 for presenting and controlling a panoramic image or some or all units in the apparatus 1500 for presenting and controlling a panoramic image. At least one of the units in the apparatus 1400 for presenting and controlling a panoramic image and the apparatus 1500 for presenting and controlling a panoramic image may store machine-executable instructions. The processor 1602 executes the machine-executable instructions in the at least one of the units in the memory 1606, to implement a function of at least one of the units.

It should be noted that not all steps and modules in the procedures and the structural diagrams are necessary, and some steps or modules may be omitted according to an actual need. An execution sequence of the steps is not fixed and may be adjusted as needed. Division of the modules is merely functional division for ease of descriptions. During actual implementation, one module may include a plurality of modules, and functions of a plurality of modules may be implemented by a same module. These modules may be located in a same device or in different devices.

Hardware modules in the embodiments may be implemented by hardware or a hardware platform combined with software. The software includes machine-readable instructions, stored in a non-volatile storage medium. Therefore, the embodiments may alternatively be reflected as software products.

In the embodiments, the hardware may be implemented by dedicated hardware or hardware executing the machine-readable instructions. For example, the hardware may be a permanent circuit or logical device (for example, a special-purpose processor, such as a field-programmable gate array (FPGA) or an application-specific integrated circuit (ASIC)) that is specially designed to perform particular operations. Alternatively, the hardware may include a programmable logic device or circuit (for example, including a general-purpose processor or another programmable processor) that is temporarily configured by software to perform particular operations.

In addition, each embodiment may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such storage medium also constitutes this application. This application further provides a non-volatile storage medium storing a data processing program. The data processing program may be used for performing any one of the foregoing embodiments.

The machine-readable instructions corresponding to the modules in FIG. 16 can enable the operating system and the like running on the computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

The foregoing descriptions are merely exemplary embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for presenting and controlling a panoramic image, performed by at least one processor of a mobile terminal, the method comprising:

sending, by the at least one processor, a panoramic image trigger instruction to a media content server in response to a panoramic image trigger operation, wherein the panoramic image trigger instruction causes the media content server to send the panoramic image trigger instruction to a smart television bound with the mobile terminal, and the panoramic image trigger instruction causes the smart television to present the panoramic image corresponding to currently presented media content;

obtaining, by the at least one processor, a description parameter indicating a position of the mobile terminal in three-dimensional space in response to an operation of the mobile terminal; and sending, by the at least one processor, the description parameter to the media content server, wherein the media content server determines an adjustment parameter of the panoramic image in panoramic space according to the description parameter and sends the adjustment parameter to the smart television, and the smart television adjusts the panoramic image according to the adjustment parameter, wherein the description parameter comprises a location change parameter and a posture change parameter, wherein the adjustment parameter comprises a viewing-angle adjustment parameter and a viewpoint adjustment parameter, wherein the obtaining the description parameter of the mobile terminal in three-dimensional space in response to the operation of the mobile terminal comprises:
  obtaining the location change parameter in response to a movement operation of the mobile terminal; and
  obtaining the posture change parameter in response to a rotation operation of the mobile terminal, and wherein the sending the description parameter to the media content server comprises:
  sending the location change parameter and the posture change parameter to the media content server, wherein the media content server determines the viewpoint adjustment parameter of the panoramic image in the panoramic space according to the location change parameter, determines the viewing-angle adjustment parameter of the panoramic image in the panoramic space according to the posture change parameter, and sends the viewpoint adjustment parameter and the viewing-angle adjustment parameter to the smart television, and wherein the smart television adjusts a viewpoint of the panoramic image according to the viewpoint adjustment parameter and adjusts a viewing angle of the panoramic image according to the viewing-angle adjustment parameter.

2. The method according to claim 1,
wherein M network access points are disposed in the three-dimensional space, M being an integer that is greater than or equal to 3, and
wherein the obtaining the description parameter of the mobile terminal in three-dimensional space comprises:
  determining coordinates of a reference point location according to M wireless signal strengths that respectively correspond to the M network access points and that are received by the mobile terminal at the reference point location;
  determining coordinates of a current location according to M wireless signal strengths that respectively correspond to the M network access points and that are received by the mobile terminal at the current location; and
  determining the location change parameter of the mobile terminal in the three-dimensional space according to the coordinates of the reference point location and the coordinates of the current location.

3. The method according to claim 1,
wherein the obtaining the description parameter of the mobile terminal in three-dimensional space comprises:
  determining wireless signal strengths of a network access point that are received by the mobile terminal at a plurality of locations, and storing coordinates of each of the plurality of locations and a corresponding wireless signal strength in an associated manner;
  determining a first wireless signal strength of the network access point received by the mobile terminal at a reference point location;
  determining a second wireless signal strength of the network access point received by the mobile terminal at a current location;
  at the current location, separately searching the stored wireless signal strengths for wireless signal strengths closest to the first wireless signal strength and the second wireless signal strength, and using location coordinates of locations corresponding to the found wireless signal strengths respectively closest to the first wireless signal strength and the second wireless signal strength as coordinates of the reference point location and coordinates of the current location; and
  determining the location change parameter of the mobile terminal in the three-dimensional space according to the coordinates of the reference point location and the coordinates of the current location.

4. The method according to claim 1,
wherein the obtaining the description parameter of the mobile terminal in three-dimensional space comprises:
  determining a reference point deflection angle and a current deflection angle of the mobile terminal according to a sensor parameter obtained from a gyroscope; and
  determining the posture change parameter of the mobile terminal according to the reference point deflection angle and the current deflection angle of the mobile terminal.

5. The method according to claim 1, wherein the method further comprises:
  receiving panoramic image data from the media content server; and
  presenting the panoramic image.

6. The method according to claim 5, wherein the method further comprises:
  receiving the adjustment parameter from the media content server; and
  adjusting the panoramic image according to the adjustment parameter.

7. The method according to claim 5, wherein the method further comprises presenting prompt information received from the media content server to prompt a user of the mobile terminal whether to present the panoramic image.

8. An apparatus for presenting and controlling a panoramic image, the apparatus comprising:
  at least one memory configured to store computer program code; and
  at least one processor configured to access the at least one memory and operate as instructed by the computer program code, the computer program code including:

trigger instruction sending code configured to cause the at least one processor to send a panoramic image trigger instruction to a media content server in response to a panoramic image trigger operation, wherein the panoramic image trigger instruction causes the media content server to send the panoramic image trigger instruction to a smart television bound with the apparatus, and the panoramic image trigger instruction causes the smart television to present the panoramic image corresponding to currently presented media content;

obtaining code configured to cause the at least one processor to obtain a description parameter indicating a position of the apparatus in three-dimensional space in response to an operation of the apparatus, and sending code configured to cause the at least one processor to send the description parameter to the media content server, wherein the media content server determines an adjustment parameter of the panoramic image in panoramic space according to the description parameter and sends the adjustment parameter to the smart television, and the smart television adjusts the panoramic image according to the adjustment parameter, wherein the description parameter comprises a location change parameter and a posture change parameter, wherein the adjustment parameter comprises a viewing-angle adjustment parameter and a viewpoint adjustment parameter, wherein the obtaining code is further configured to cause the at least one processor to obtain the location change parameter in response to a movement operation of the apparatus, and obtain the posture change parameter in response to a rotation operation of the apparatus, and wherein the sending code is further configured to cause the at least one processor to send the location change parameter and the posture change parameter to the media content server, wherein the media content server determines the viewpoint adjustment parameter of the panoramic image in the panoramic space according to the location change parameter, determines the viewing-angle adjustment parameter of the panoramic image in the panoramic space according to the posture change parameter, and sends the viewpoint adjustment parameter and the viewing-angle adjustment parameter to the smart television, and wherein the smart television adjusts a viewpoint of the panoramic image according to the viewpoint adjustment parameter and adjusts a viewing angle of the panoramic image according to the viewing-angle adjustment parameter.

9. The apparatus according to claim 8, wherein M network access points are disposed in the three-dimensional space, M being an integer that is greater than or equal to 3, and wherein the computer program code further includes determining code configured to cause the at least one processor to:

determine coordinates of a reference point location and coordinates of a current location according to M wireless signal strengths that respectively correspond to the M network access points and that are received by the apparatus at the reference point location;

determine coordinates of the current location according to M wireless signal strengths that respectively correspond to the M network access points and that are received by the apparatus at the current location; and determine the location change parameter of the apparatus in the three-dimensional space according to the coordinates of the reference point location and the coordinates of the current location.

10. The apparatus according to claim 8, wherein the computer program code further includes determining code configured to cause the at least one processor to:

determine wireless signal strengths of a network access point that are received by the apparatus at a plurality of locations, and store coordinates of each of the plurality of locations and a corresponding wireless signal strength in an associated manner;

determine a first wireless signal strength of the network access point received by the apparatus at a reference point location;

determine a second wireless signal strength of the network access point received by the apparatus;

separately search, at a current location, the stored wireless signal strengths for wireless signal strengths closest to the first wireless signal strength and the second wireless signal strength, and using location coordinates of locations corresponding to the found wireless signal strengths respectively closest to the first wireless signal strength and the second wireless signal strength as coordinates of the reference point location and coordinates of the current location; and determine the location change parameter of the apparatus in the three-dimensional space according to the coordinates of the reference point location and the coordinates of the current location.

11. The apparatus according to claim 8, wherein the obtaining code is further configured to cause the at least one processor to:

determine a reference point deflection angle and a current deflection angle of the apparatus according to a sensor parameter obtained from a gyroscope; and determine the posture change parameter of the apparatus according to the reference point deflection angle and the current deflection angle of the apparatus.

12. The apparatus according to claim 8, wherein the computer program code further includes receiving code configured to cause the at least one processor to receive panoramic image data from the media content server and present the panoramic image.

13. The apparatus according to claim 12, wherein the computer program code further includes:

adjustment parameter receiving code configured to cause the at least one processor to receive the adjustment parameter sent by the media content server; and adjusting code configured to cause the at least one processor to adjust the panoramic image according to the adjustment parameter.

14. The apparatus according to claim 12, wherein the computer program code further includes presenting code configured to cause the at least one processor to prompt a user of the apparatus whether to present the panoramic image.

15. One or more non-transitory storage media storing computer readable instructions, the computer readable instructions, when executed by one or more processors of a mobile terminal, cause the mobile terminal to:

send a panoramic image trigger instruction to a media content server in response to a panoramic image trigger operation, wherein the panoramic image trigger instruction causes the media content server to send the panoramic image trigger instruction to a smart television bound with the mobile terminal, and the panoramic image trigger instruction causes the smart television to present a panoramic image corresponding to currently presented media content;

obtain a description parameter indicating a position of the mobile terminal in three-dimensional space in response to an operation of the mobile terminal; and send the description parameter to the media content server, wherein the media content server determines an adjustment parameter of the panoramic image in panoramic space according to the description parameter and sends the adjustment parameter to the smart television, and the smart television adjusts the panoramic image according to the adjustment parameter, wherein the description parameter comprises a location change parameter and a posture change parameter, wherein the adjustment parameter comprises a viewing-angle adjustment parameter and a viewpoint adjustment parameter, wherein the computer readable instructions further cause the one or more processors to obtain the description parameter of the mobile terminal by:

obtaining the location change parameter in response to a movement operation of the mobile terminal; and obtaining the posture change parameter in response to a rotation operation of the mobile terminal, and wherein the computer readable instructions further cause the one or more processors to send the description parameter to the media content server by:

sending the location change parameter and the posture change parameter to the media content server, wherein the media content server determines the viewpoint adjustment parameter of the panoramic image in the panoramic space according to the location change parameter, determines the viewing-angle adjustment parameter of the panoramic image in the panoramic space according to the posture change parameter, and sends the viewpoint adjustment parameter and the viewing-angle adjustment parameter to the smart television, and wherein the smart television adjusts a viewpoint of the panoramic image according to the viewpoint adjustment parameter and adjusts a viewing angle of the panoramic image according to the viewing-angle adjustment parameter.

16. The one or more non-transitory storage media according to claim 15, wherein M network access points are disposed in the three-dimensional space, M being an integer that is greater than or equal to 3, and wherein the computer readable instructions further cause the one or more processors to obtain the description parameter of the mobile terminal by:

determining coordinates of a reference point location according to M wireless signal strengths that respectively correspond to the M network access points and that are received by the mobile terminal at the reference point location;

determining coordinates of a current location according to M wireless signal strengths that respectively correspond to the M network access points and that are received by the mobile terminal at the current location; and determining the location change parameter of the mobile terminal in the three-dimensional space according to the coordinates of the reference point location and the coordinates of the current location.

17. The one or more non-transitory storage media according to claim 15, wherein the computer readable instructions further cause the one or more processors to obtain the description parameter of the mobile terminal by:

determining wireless signal strengths of a network access point that are received by the mobile terminal at a plurality of locations, and storing coordinates of each of the plurality of locations and a corresponding wireless signal strength in an associated manner;

determining a first wireless signal strength of the network access point received by the mobile terminal at a reference point location;

determining a second wireless signal strength of the network access point received by the mobile terminal at a current location;

at the current location, separately searching the stored wireless signal strengths for wireless signal strengths closest to the first wireless signal strength and the second wireless signal strength, and using location coordinates of locations corresponding to the found wireless signal strengths respectively closest to the first wireless signal strength and the second wireless signal strength as coordinates of the reference point location and coordinates of the current location; and determining the location change parameter of the mobile terminal in the three-dimensional space according to the coordinates of the reference point location and the coordinates of the current location.

* * * * *